(12) United States Patent
Nikkel et al.

(10) Patent No.: US 6,279,666 B1
(45) Date of Patent: Aug. 28, 2001

(54) ROW CROP DEBRIS CLEARING APPARATUS

(75) Inventors: Lee F. Nikkel; Eugene H. Schmidt, both of Madrid, NE (US)

(73) Assignee: A.I.L., Inc., North Platte, NE (US)

( * ) Notice: Subject to any disclaimer, the term of this patent is extended or adjusted under 35 U.S.C. 154(b) by 618 days.

(21) Appl. No.: 08/786,742

(22) Filed: Jan. 27, 1997

Related U.S. Application Data

(63) Continuation-in-part of application No. 08/599,082, filed on Feb. 9, 1996.

(51) Int. Cl.$^7$ ............................................. A01B 5/00
(52) U.S. Cl. .......................... 172/574; 111/140; 111/165
(58) Field of Search ................................. 111/139, 140, 111/143, 165, 166, 168, 169; 172/571, 555, 604, 740, 744, 540, 603

(56) References Cited

U.S. PATENT DOCUMENTS

| | | | |
|---|---|---|---|
| 617,454 | 1/1899 | Whittier | 172/65 |
| 1,884,720 | * 10/1932 | Karl | 172/555 X |
| 2,698,565 | 1/1955 | Carney | 172/574 |
| 2,826,133 | 3/1958 | Moss | 172/65 |
| 3,173,498 | 3/1965 | Heilbrun | 172/540 |
| 3,306,371 | 2/1967 | Bush | 172/574 |
| 3,621,922 | * 11/1971 | Hinken | 172/555 |
| 4,295,532 | 10/1981 | Williams et al. | 172/184 |
| 4,424,869 | 1/1984 | vom Braucke et al. | 172/349 |
| 4,425,973 | 1/1984 | Williams et al. | 172/574 |
| 4,430,952 | 2/1984 | Murray | 111/185 |
| 4,431,061 | * 2/1984 | White | 172/574 X |
| 4,483,401 | 11/1984 | Robertson | 172/574 |
| 4,550,122 | 10/1985 | David et al. | 172/158 |
| 4,562,780 | 1/1986 | Leiblich | 111/88 |
| 4,585,073 | 4/1986 | Mayeda et al. | 172/158 |
| 4,660,653 | 4/1987 | Mayeda et al. | 172/522 |
| 4,785,890 | 11/1988 | Martin | 172/29 |
| 4,930,431 | 6/1990 | Alexander | 111/164 |
| 5,076,180 | * 12/1991 | Schneider | 111/139 |
| 5,129,282 | 7/1992 | Bassett et al. | 74/529 |
| 5,279,236 | 1/1994 | Truax | 111/139 |
| 5,341,754 | 8/1994 | Winterton | 111/139 |
| 5,346,020 | * 9/1994 | Bassett | 172/555 X |
| 5,458,203 | 10/1995 | Evers | 172/569 |
| 5,461,995 | 10/1995 | Winterton | 111/139 |
| 5,477,792 | 12/1995 | Bassett et al. | 111/121 |
| 5,479,868 | 1/1996 | Bassett | 111/139 |
| 5,482,120 | 1/1996 | Lloyd | 172/21 |
| 5,497,836 | 3/1996 | Groff | 172/555 |
| 5,588,382 | * 12/1996 | Embree et al. | 111/139 |
| 5,620,055 | * 4/1997 | Javerlhac | 172/604 |
| 5,657,707 | * 8/1997 | Dresher et al. | 111/139 |
| 5,660,126 | * 8/1997 | Freed et al. | 111/139 X |
| 5,704,430 | * 1/1998 | Smith et al. | 111/140 X |

FOREIGN PATENT DOCUMENTS

889524 * 9/1953 (DE) ..................................... 111/166

OTHER PUBLICATIONS

DAWN 1994 Catalog, "How to Choose a Trash Management System", Jan. 1994, pp. 1–11.

* cited by examiner

*Primary Examiner*—Victor Batson
(74) *Attorney, Agent, or Firm*—Greer, Burns & Crain, Ltd.

(57) ABSTRACT

A debris clearing apparatus for use in agricultural operations. It includes a pair of rotatable concave disks arranged in a generally V-shaped orientation to spread debris encountered during forward movement. The disks have a plurality of relatively deep backswept notches.

18 Claims, 2 Drawing Sheets

ROW CROP DEBRIS CLEARING APPARATUS

This application is a continuation-in-part of application Ser. No. 08/599,082, filed Feb. 9, 1996.

The present invention generally relates to debris clearing apparatus and more particularly relates to row crop debris clearing apparatus for agricultural usage.

The increased use of low-till and no-till farming techniques has produced a need for apparatus that can be attached to farm implements for clearing debris such as mulch., plant stalks, and the like from the ground, particularly during planting of a row crop such as corn. It is well known that the optimum emergence of corn plants is a function of the precision with which the corn seeds are planted. It is very important for desired emergence that the seed be planted at a precise depth and spacing during the planting operation. Since the depth of planting of the seed is controlled by rubber wheels of the planter unit, the presence of corn stalks or other mulch or debris in the row line during the planting operation can change the elevation of the wheels and therefore the planter itself. This then affects the depth of planting of the seeds which usually results in poor emergence of the crop.

It is also important that debris be cleared from the row line if herbicides are to be applied to the field during planting. It is well known that the herbicide will be less effective if it merely contacts the debris rather than the soil itself. For these reasons, there has been considerable activity in the development of debris clearing apparatus that can be attached to a planter or other implement, which operates to move the mulch and debris out of the path of the planter so that accurate planting can be carried out and effective use of herbicides is achieved.

Among the designs that exist are those disclosed in such patents as Williams et al. U.S. Pat. No. 4,425,973, and Martin U.S. Pat. No. 4,785,890, among others. The Martin patent discloses flat, sharply toothed wheels that are arranged in a true "V" to spread the debris that is engaged and move it out of the way of the planting unit in which it precedes. The Williams et al. patent discloses a similar V-shaped orientation for a pair of concave, shallow notched disks. While these designs are effective to a degree, they both exhibit a less than optimum clearing result in that they often exhibit a problem of the engaged debris not being effectively released from the wheels or disks because it tends to wrap on the disk and often ultimately fouls it. This requires the operator to stop his farming operation and remove the debris from the apparatus.

Another problem with prior art designs is that the clearing disks interfere with one another. If two clearing disks each contact a single item of debris at the same time, both disks pull the debris in opposite directions. Frequently, this results in the debris plugging up the apparatus or not being removed from the path.

Accordingly, it is a primary object of the present invention to provide an improved debris clearing apparatus for use in agricultural applications.

It is another object of the present invention to provide such an improved apparatus having a clean and uncomplicated design, which enables it to be manufactured with a relatively few number of parts, but which provides superior operation in clearing debris along a path without fouling.

It is another object of the present invention lies in the provision for a unique notch design for clearing disks, which by virtue of the angular orientation of the forward and rearward edges of the notch edges, uniquely utilizes the inertia of the debris as well as gravitational force to optimize the clearing operation and prevent the debris from wrapping on the disks.

It is another object of the present invention is to provide such an improved apparatus having a first clearing blade spaced apart from a second clearing disk along a longitudinal cleaning direction of a row path such that the two clearing disks do not interfere with one another by both contacting a common piece of debris.

These and other objects and advantages will become apparent upon reading the following detailed description, while referring to the attached drawings, in which.

DETAILED DESCRIPTION

Broadly stated, the present invention is directed to a debris clearing apparatus for agricultural operations, and particularly for use in row crop applications such as planting corn or other row crops in a field where debris is usually present from a prior growing season. The apparatus has a simple and clean design and can be inexpensively fabricated, largely using relatively common readily available components. It is easily installed and adjusted to the desired depth and efficiently operates to clear mulch and other debris from the path of a following implement such as a corn planter or the like.

Figure 1:
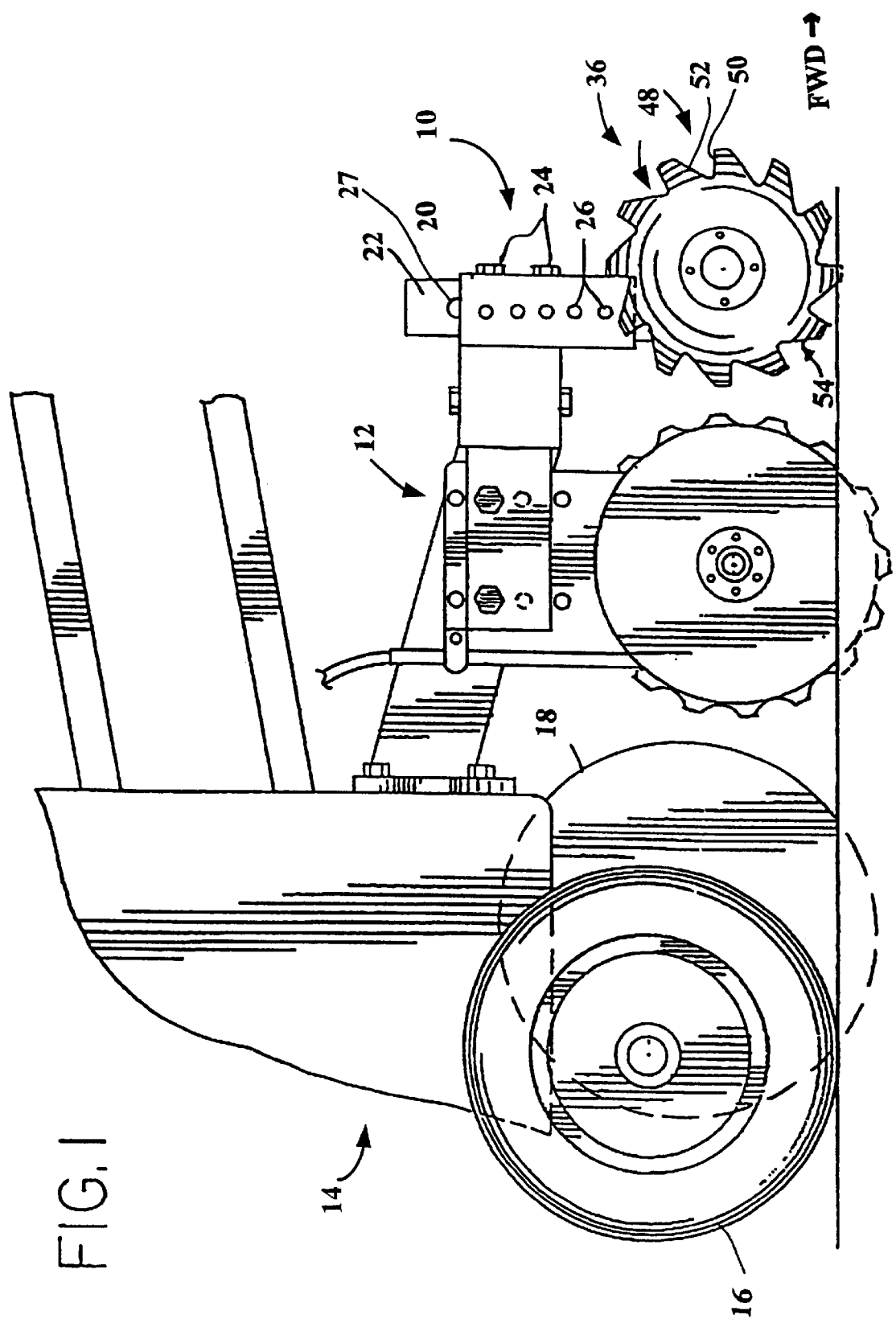
FIG. 1 is a side illustration of the present invention and is shown together with other farm implements.

Turning now to the drawings, and particularly FIG. 1, the apparatus of the present invention, indicated generally at 10, is shown attached to a farm implement, which in this embodiment, is a fertilizer applying apparatus 12. The apparatus 12 is in turn attached to a corn planter, indicated generally at 14. It should be understood that other implements may profitably utilize the present invention for clearing a path during its operation. In the example shown in FIG. 1, the corn planter 14 has rubber tired wheels 16 which provides the reference surface elevation for planting disks 18 which cut a groove in the earth in which other components (not shown) plant seeds of corn or the like during operation.

If the field is full of corn stalks and other mulch, the tires 16 will ride up and down depending upon the thickness of the mulch and this will have an effect on the depth of planting of the seeds by the planter. As previously mentioned, if the planting depth is not correct, the emergence of the crop may be detrimentally affected and productivity of the producer will be decreased.

In the embodiment of FIG. 1, the apparatus 10 of the present invention is installed on the fertilizer applying apparatus 12, which includes a bracket 20 in which a shank portion 22 of the present invention may be inserted. The bracket 20 has bolts or pins 24 which fit within apertures 26 and which can be tightened to hold the shank 22 at the appropriate depth. It should be understood that a farm implement may have many planters for simultaneously planting many rows of crops and for each planting unit, there may be provided a fertilizer unit 12 as well as a debris clearing apparatus 10 embodying the present invention. It is desirable that all of the rows have their implements set at the same depth so that consistency in planting, fertilizer applying and clearing is achieved. In this regard, the shank 22 also has a number of apertures 27 through which the bolts 24 may pass for setting the elevation of various ones of the apparatus 10 at a consistent depth from row to row.

The fertilizer applying apparatus 12 is the subject of a patent application entitled "Apparatus For Use In Applying Fertilizer", Ser. No. 08/593,684, filed Jan. 29, 1996, which is assigned to the same assignee as the present invention and that application is specifically incorporated by reference herein even though it does not form a part of the present invention. Similarly, the planting unit 14 or other implement that may be used in combination with the apparatus of the present invention also does not form a part of the present invention.

Figure 2:
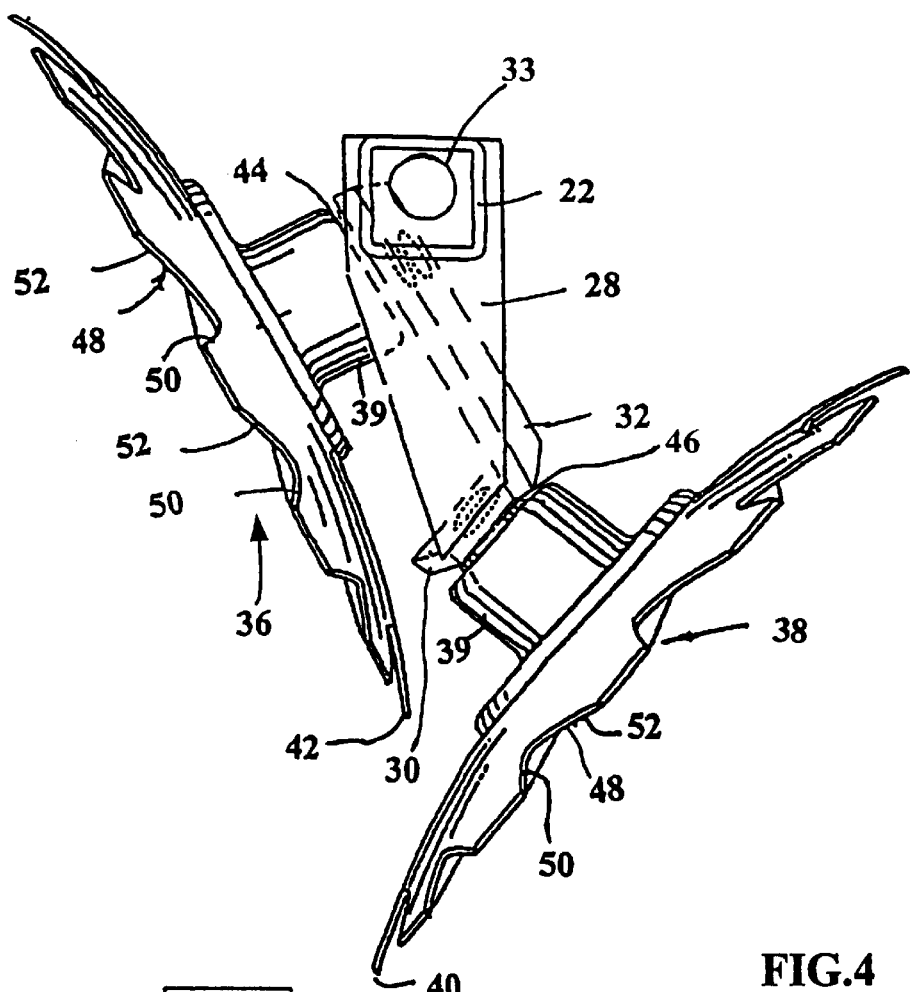
FIG. 2 is a top view of the application of the present invention.
Figure 3:
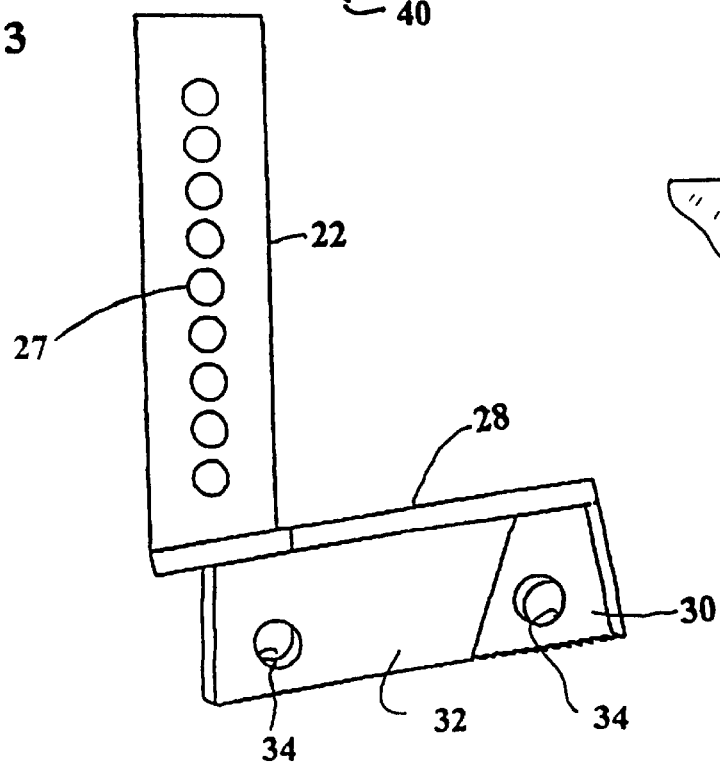
FIG. 3 is a side elevation of the frame portion of the present invention.

The structure of the apparatus is relatively simple, and referring to FIGS. 2 and 3, the shank 22 is attached to a frame structure that also includes a support that comprises an elongated flat plate 28, preferably by welding. The plate 28 is attached to a small front side wall 30 and a longer rear side wall 32, preferably by welding. The plate 28 has an aperture 33 inside the shank 22 for draining water and the like. The side walls 30 and 32 have apertures 34 for mounting rearward and forward rotatable disks, indicated generally at 36 and 38, respectively, to the side walls 32 and 30. The disks are journaled for rotation utilizing a mount structure 39 that has internal bearings attached to axles 44 using a construction that is well known in the art.

Figure 4:
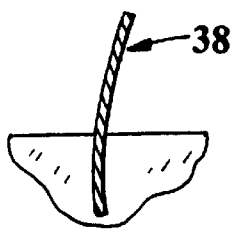
FIG. 4 is a cross-section of a portion of a disk shown penetrating the ground by a distance of about 1 to 2 inches, and particularly illustrating the generally vertical orientation of the penetrating portion.

In accordance with an important aspect of the present invention, the side walls 30 and 32 are preferably angled relative to vertical by about 15 degrees, as shown in FIG. 2. Such angular orientation of the side walls results in a plane defined by the outer edges of each of the disks being angled relative to vertical, such that the top reach of each disk 36 and 38 extends outwardly farther than the lower reach. Such angular orientation of the disks results in the portion of the disks that penetrate the ground, which is less than about 2 inches, be generally vertical as is desired and as shown in FIG. 4. It has been found that if the disks are angled more than about 15 degrees, the disks tend to push the trash to the side only a small distance and that the disks often fail to rotate well. Also, if the disks are angled less than 15 degrees relative to vertical, it has been found that the debris is pitched too far from the row path and may interfere with an adjacent row path.

As shown in FIG. 2, the disk 38 is mounted to the forward aperture 34, while the disk 36 is mounted in the rearward one. This, together with different lengths of the front side wall 30 and the rear side wall 32, enables the forward reach of the disk 38 (marked 40) to be ahead of the forward reach of the disk 36 (marked 42) by a sufficient distance that the two disks do not interfere with one another in the sense of competing for the same pieces of debris. However, as the apparatus moves forwardly through the field, both forward reaches 40 and 42 are generally on the same line in the direction of movement, so that no debris is missed during operation.

Specifically, according to the preferred embodiment of the present invention, the forward reach 40 of the disk 38 is within the range of about 3 to about 10 inches ahead of the disk 36, and preferably about 4.5 inches. This spacing of the disks ensures that both disks are not interfering with each other by simultaneously engaging a single item of debris. It should be understood that the present invention would work equally well if the positioning of the disks were reversed. It is desirable that for implements that have multiple row or row path apparatus mounted thereon, that a generally equal number of the configurations shown in FIG. 2 be reversed configurations. This produces a balancing of lateral forces that are usually produced when one disk is forward of the other on each apparatus, and minimizes the unwanting sideways movement of the implement produced by the uneven lateral forces.

The disk 36 is journaled to axle 44 which is attached to the side wall 32 by attachment through the rearward aperture 34, and the disk 38 is journaled to axle 46 which is attached to the side wall 30 by attachment through the forward aperture 34 by conventional means not shown. The side wall 32 is longer than the side wall 30 to properly position the forward reaches 40 and 42 relative to one another as shown and previously described. The disks are mounted so that the inner sides are attached to their associated axles and the outer sides are presented for contact for engagement with the debris. It should be understood that the construction of the journals may be such that they fit within an opening in the disk and are therefore technically attached to both sides of the disk. However, for purposes herein, the axles are attached to one of the side walls 30, 32 and are on the inside of the disks as shown in the drawings.

The outside surface of each of the disks is concave and the generally circular outer periphery of each disk also contains relatively deep backswept notches, indicated generally at 48, that are spaced from one another around the periphery. While the size of the disks are not critical, they are preferably at least 13 inches in diameter and may even be up to about 20 inches in diameter in some applications. A major consideration in having larger sized disks is the clearance requirements of the apparatus in relation to other components of other implements, including drive shafts and the like. Also, while the number of notches in each disk is not particularly critical, it is preferred that there be at least nine and preferably about 12 of such notches per disk for a disk diameter of about 13 inches. The depth of the notches, while also not particularly critical, should be deeper than the shallow notches disclosed in the aforementioned Williams et al. patent, and are preferably at least 1¾ inches deep from the outermost diameter of the disk to the deepest point of the notch. If the disk size is larger, i.e., approaching the 20" diameter, it is preferred that the number of notches be increased proportionately, and that the depth of the notches stay about the same. Thus, a 20" diameter disk would preferably have about 20 notches of 1¾" depth.

In accordance with an important aspect of the present invention, and as best shown in FIG. 1, the configuration of the notches 48 is extremely important in the superior operation of the present invention and cach of the notches 48 has a forward edge 50 and a rearward edge 52. The forward edge 50 is preferably slightly curved but is oriented generally in the radial direction from the outer periphery to the deepest point of the notch, where it meets the rearward edge 52 which extends to the outer periphery at a much different angle that is more tangential than radial. In this regard, the angle between the forward and rearward edges 50 and 52 is preferably within the range of about 50° to about 70° and in the preferred embodiment is about 60°.

As shown in FIG. 1, the forward edge 50 is the edge of the notch that first engages the ground during rotation during movement of the implement in the forward direction, as shown by the arrow marked FWD. As the forward edge 50 engages the ground, the disk 36 will tend to move clockwise as shown in FIG. 1, so that as the forward edge 50 begins to move out of contact with the ground, the rearward edge 52 is the last edge to lose contact with the ground and as the disk continues to rotate, the orientation of the rearward edge 52 is generally vertical as shown at location 54 in FIG. 1. This is important in minimizing the tendency for debris to wrap on the disk and this occurs because with the vertical orientation, there is very little resistance holding the debris on the disk as it begins to move away from the ground.

The combined effect of inertia which will tend to separate the debris from the rotating disk and gravitational forces acting on the debris coupled with the absence of any retaining surface of the disk tend to result in the material being passed aside as is desired. It is also important to note that the concavity of the outside of the disks and the use of inertia also contributes to the separation of the mulch and other debris and cast it aside as is desired.

The apparatus is preferably set so that the disk does contact and move the dirt and no attempt is made to minimize the tilling of the dirt, for that is believed to be desirable. It has been found that minimum tilling of the dirt tends to contribute to the separation of the dirt from the mulch and the combination of the configuration of the notches 48 with the concavity of the disks results in superior operation in clearing the debris without experiencing undesirable wrapping.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for use with a farm implement for clearing debris from a path in a field during forward movement of the farming implement, said apparatus comprising:
    a frame structure having a support;
    a pair of rotatable clearing disks, each having an inward and outward side, each disk having a generally circular outer shape, a generally concave outward side surface and a plurality of backswept notches in its outer periphery;
    a pair of disk mounts for attaching said pair of clearing disks to said support, said disk mounts being oriented to position each of said pair of disks to converge adjacent one another at the forward reach of said disks, the rearward reach of said disks being spaced apart from one another so that the general planes of the disks are angled outwardly from the forward reach to the rearward reach thereof;
    said inward side of each of said rotatable clearing disks being attached to one of said disk mounts;
    the forward reach of one of said clearing disks being spaced between about 3 and about 10 inches from the forward reach of the other of said clearing disks in a direction along said path; and
    a mounting means for attaching said apparatus to the farm implement.

2. Apparatus as defined in claim 1 wherein said support comprises:
    a shank having a longitudinal axis and first and second ends;
    a generally flat plate connected to said first end of said shank generally orthogonally to said longitudinal axis; and
    first and second side walls each having an aperture, said first side wall being shorter than said second side wall, said first and second side walls being attached to said flat plate,
    wherein one of said clearing disks is operatively connected to each said aperture such that said disks are each angled at an acute angle relative to horizontal.

3. Apparatus as defined in claim 1 wherein each said disk mount comprises an axle having opposite end portions mounted to said support and to one of said clearing disks.

4. Apparatus as defined in claim 3 wherein each said axle includes a journal means having internal bearings for providing rotational movement of said clearing disks.

5. Apparatus as defined in claim 1 wherein said mounting means comprises an elongated shank attached to said support.

6. Apparatus as defined in claim 5 wherein said shank is generally vertically oriented and has a hollow square cross section and contains a plurality of apertures vertically spaced along at least one side adapted to receive locking means for adjustably securing said apparatus to the farming implement.

7. Apparatus as defined in claim 1 wherein each said clearing disk has an outer diameter of at least about 13 inches.

8. Apparatus as defined in claim 1 wherein each said backswept notch comprises a forward edge and a rearward edge, said forward edge being the first portion of said notch contacting the ground as said clearing disk rotates during forward movement of the farming implement, said forward edge extending from the outermost peripheral portion of said disk generally radially inwardly to a predetermined depth and the rearward edge extending from the forward edge to the outermost peripheral portion of said disk, said forward and rearward edges cooperatively defining an angle within the range of about 50° to about 70°.

9. Apparatus as defined in claim 8 wherein said angle between said forward and rearward edges is about 60°.

10. Apparatus for clearing debris from a path during a farming operation in a field during forward movement thereof, said apparatus being adapted to be attached to a farming implement such as a planter, said apparatus comprising:
    a frame structure adapted to be mounted ahead of the farming implement and having a support carrying a pair of clearing disks and a mounting means for attaching said apparatus to the farm implement;
    first and second rotatable clearing disks, each said clearing disk having an inward and outward side, the inward side of each of said clearing disks being attached to a respective one of said disk mounts, each disk having a generally circular outer shape, a generally concave outward side surface and a plurality of backswept notches in its outer periphery, the forward reach of said first clearing disk being spaced apart from the forward reach of said second clearing disk in a clearing direction within the range of about 3 and about 10 inches to minimize the possibility of said first and second disks both contacting a particular item of debris at the same time; and
    means attached to said frame structure for journaling said pair of clearing disks for rotation, said journaling means being oriented to position said disks at an angle relative to the direction of forward movement so that the forward reaches of said disks are closer to one another than the rearward reaches, thereby generally defining a generally V-shape symmetrically centered about the direction of forward movement, said clearing disks contacting the field and debris and moving the debris outwardly relative to said disks to thereby clear said path near said clearing disks during forward movement of said apparatus.

11. Apparatus as defined in claim 10 wherein each said backswept notch comprises a forward edge and a rearward edge, said forward edge being the first portion of said notch contacting the ground before said rearward edge as said clearing disk rotates during forward movement of the farming implement, said forward edge extending from the outermost peripheral portion of said disk generally radially inwardly to a predetermined depth and the rearward edge extending from the forward edge to the outermost peripheral portion of said disk, the angle between said forward and rearward edges being within the range of about 50° to about 70°.

12. Apparatus as defined in claim 11 wherein said angle between said forward and rearward edges is about 60°.

13. Apparatus as defined in claim 11 wherein the diameter of each said disk is at least about 13 inches and said predetermined depth of said notch is about 1¾ inch.

14. Apparatus for clearing debris from a path during a farming operation in a field during forward movement thereof, said apparatus being adapted to be attached to a farming implement, said apparatus comprising:

a frame structure adapted to be mounted ahead of the farming implement and having a support carrying a pair of clearing disks and a mounting means for attaching said apparatus to the farm implement;

a pair of rotatable clearing disks, each having an inward and outward side, the inward side of each of which is attached to one of said disk mounts, each disk having a generally circular outer shape, a generally concave outward side surface and a plurality of backswept notches in its outer periphery, each said backswept notch comprising a forward edge and a rearward edge, said forward edge contacting the ground before said rearward edge as said clearing disk rotates during forward movement of the farming implement, said forward edge extending from the outermost peripheral portion of said disk generally radially inwardly to a predetermined depth and the rearward edge extending from the forward edge to the outermost peripheral portion of said disk, said rearward edge being generally vertical as said notch moves up from the ground during rotation of said disk so that debris tends to separate from said disk during continued rotation thereof, the forward reach of said first clearing disk being spaced a predetermined distance apart from the forward reach of said second clearing disk in a clearing direction to minimize the possibility of said first and second disks both contacting a particular item of debris at the same time, said predetermined distance being within the range of about 3 and about 10 inches; and means attached to said frame structure for journaling said pair of clearing disks for rotation, said journaling means being oriented to position said disks at an angle relative to the direction of forward movement so that the forward reaches of said disks are closer to one another than the rearward reaches, thereby generally defining a V-shape symmetrical about the direction of forward movement, said clearing disks contacting the field and debris and moving the debris outwardly relative to said disks to thereby clear said path near said clearing disks during forward movement of said apparatus.

15. Apparatus as defined in claim 14 wherein the angle between said forward and rearward edges is within the range of about 50° to about 70°.

16. Apparatus as defined in claim 15 wherein said angle between said forward and rearward edges is about 60°.

17. Apparatus as defined in claim 14 wherein each said clearing disk has an outer diameter of at least about 13 inches and said plurality of notches comprises about 12 notches.

18. Apparatus as defined in claim 14 wherein said predetermined distance is about 4.5 inches.

\* \* \* \* \*